United States Patent
Mohamed et al.

(10) Patent No.: US 7,457,881 B2
(45) Date of Patent: Nov. 25, 2008

(54) METHOD AND APPARATUS FOR SENDING DATA FROM ONE PROTOCOL LAYER TO ANOTHER

(75) Inventors: Ansari Mohamed, Santa Clara, CA (US); Ajitkumar A Natarajan, Campell, CA (US); Nadathur S. Sundar, Sunnyvale, CA (US); Mamta N. Byakod, Cupertino, CA (US); Ranjit Manomohan, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 893 days.

(21) Appl. No.: 10/641,941

(22) Filed: Aug. 14, 2003

(65) Prior Publication Data
US 2005/0038895 A1 Feb. 17, 2005

(51) Int. Cl.
*G06F 13/00* (2006.01)

(52) U.S. Cl. .................................. 709/230; 709/236
(58) Field of Classification Search .............. 709/230, 709/229, 236
See application file for complete search history.

(56) References Cited

U.S. PATENT DOCUMENTS

| 6,792,467 | B2 * | 9/2004 | Hale et al. ................. 709/229 |
| 6,990,107 | B1 * | 1/2006 | Rinne et al. .............. 370/395.6 |
| 2003/0185216 | A1 * | 10/2003 | Wende et al. ............ 370/395.5 |
| 2006/0078000 | A1 * | 4/2006 | Rinne et al. ................. 370/469 |

* cited by examiner

*Primary Examiner*—Kenneth R Coulter

(57) ABSTRACT

When a data packet is received in one protocol layer, packet processing information is generated for the data packet and a descriptor for the packet processing information is generated. The packet processing information, the descriptor and the data packet are associated with each other and conveyed to a second protocol layer.

18 Claims, 11 Drawing Sheets

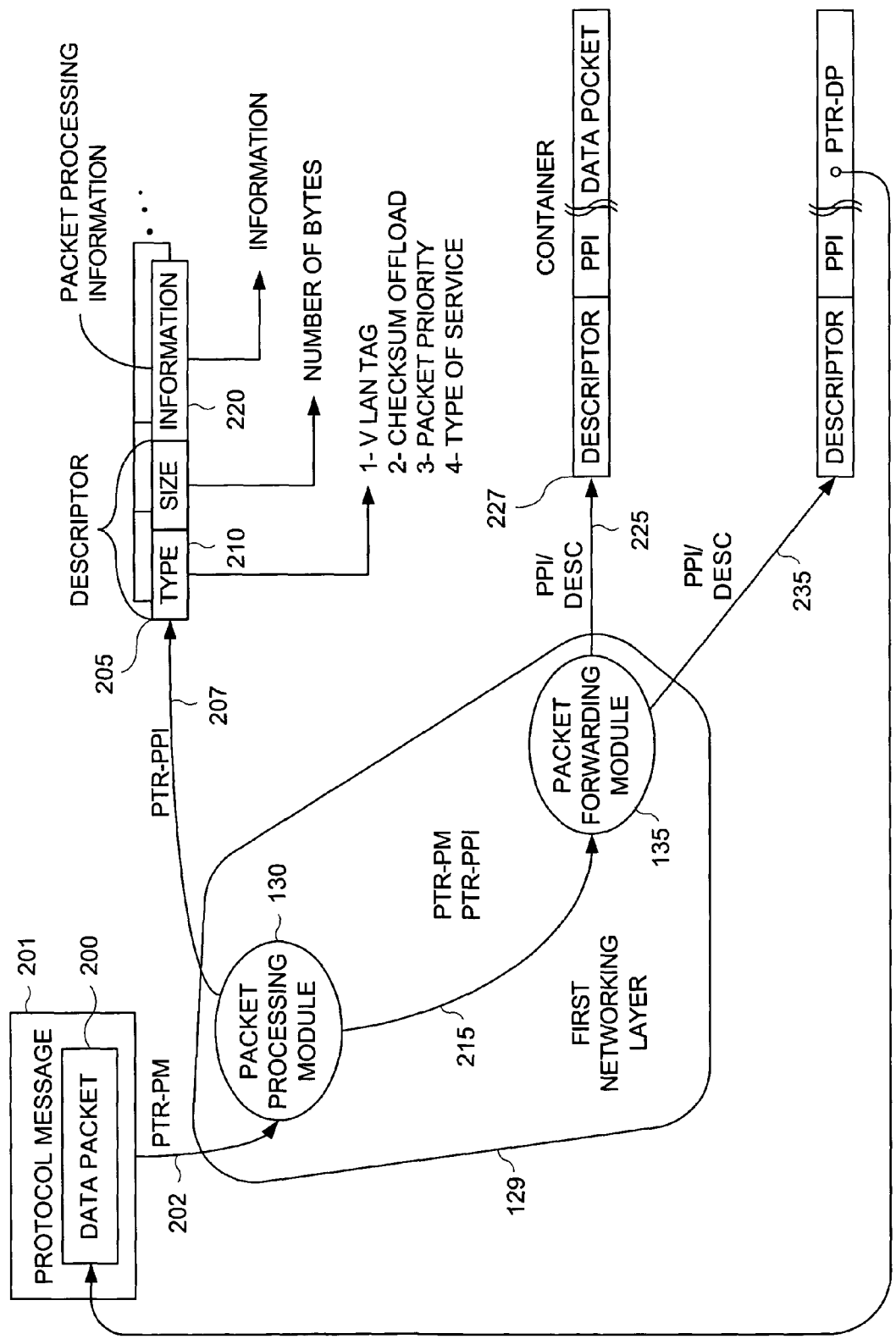

METHOD AND APPARATUS FOR SENDING DATA FROM ONE PROTOCOL LAYER TO ANOTHER

BACKGROUND

An operating system is a program that controls the allocation of processing and other resources in a computer. The operating system also controls the execution of application programs and provides utility functions such as file system management and network connectivity. Network connectivity is usually provided by a "protocol stack". Significant strategic planning and specification of the individual functional modules included in the operating system precede development and deployment. This is due in part to the complex nature of an operating system.

Another significant factor in the design and development of an operating system and the care taken in planning and specifying the individual functional modules contained therein is the reliance by third party developers on operating system specifications. For example, many hardware components are developed by companies that do not have any interaction whatsoever with the entity that develops and markets an operating system. These hardware manufacturers need to create software drivers that enable the operating system to use the hardware component. Still other companies develop specialized network protocol stack components. All of these third-party developed functional modules remain compatible with the operating system—thanks to the stability and reliability of the operating system specifications promulgated by the operating system's maker.

Because so much effort is required to qualify a new embodiment of a protocol layer, and partly because of the need to provide specification stability to a community of third party developers, independence is an important design objective. For any embodiment, hardware or software, of a protocol layer that is included with or intended to operate in conjunction with the operating system, independence in design ensures that new embodiments designed in accordance with an operating system specification or in accordance with the functionality specified by a particular layer in the network protocol will work and play well with others.

A protocol stack is, in essence, a collection of functional protocol layers that implement a network protocol. A data packet, which is one example of a quantum of data, is typically encapsulated in a protocol message. The protocol message is used to convey the data packet from one protocol layer to the next. As the data packet is processed by succeeding protocol layers, the size of the protocol message increases such that it becomes burdensome for a receiving protocol layer to extract the data packet from the protocol message. And, many processing directives, known as packet processing information, need to be extracted from the protocol message as well. In order to reduce some of the burden in extracting this packet processing information, one example embodiment of a protocol stack supports the conveyance of packet processing information from one protocol layer to another outside of the normal channel (i.e. outside of the protocol message). This alternative conveyance mechanism is known as out-of-packet communications.

A technique has been developed for enabling an embodiment of a first protocol layer to determine what type of packet processing information an embodiment of a protocol layer is able to provide. This technique is called option negotiations. A good example of this technique is employed by one example embodiment of a Data Link Layer. According to this example embodiment, the Data Link Layer may discover that a hardware driver (an embodiment of the Physical Layer) is capable of providing a checksum for a data packet received from the computer network. Hence, the Data Link Layer can determine that a checksum is available from the driver. By using the checksum provided by the driver, the embodiment of the Data Link Layer is able to avoid an independent checksum calculation, thus saving processing resources (in a software embodiment).

Once the option negotiation between embodiments of two protocol layers is complete, a template for communicating out-of-packet data between the two embodiments is selected. This template is selected based on the capabilities of the embodiments of the two protocol layers at the time they are both designed. So long as the embodiments of both protocol layers are designed and developed in cooperation with each other (e.g. the two protocol layer embodiments result from the collaborative efforts of two design groups), the notion of using a static template that defines the composition of any out-of-packet data remains viable. This type of collaboration amongst design groups in the design phase of a product is somewhat contrary to the notion of design independence. Collaboration amongst design groups is often required to achieve stability and accuracy in design specifications. But once the specifications are reliable, embodiments of two protocol layers should interact correctly without collaboration in the design phase so long as the embodiments adhere to the specifications.

It is difficult to encourage, let alone enforce such collaborative efforts. As noted earlier, many third party developers develop drivers for unique hardware devices. Still other companies develop specialized embodiments of one or more layers of a protocol stack. And, in light of networking protocol evolution, it is difficult to define stable out-of-packet templates for layers of a protocol stack even amongst design groups in a single company (e.g. design groups engaged by the operating system's maker).

SUMMARY

A method and an embodiment thereof for sending data from one protocol layer to another comprising receiving a data packet in a first layer, generating packet processing information for the data packet, generating a descriptor for the packet processing information, associating the packet processing information, the descriptor and the data packet with each other and conveying the packet processing information, the descriptor and the data packet to a second layer.

BRIEF DESCRIPTION OF THE DRAWINGS

Several alternative embodiments will hereinafter be described in conjunction with the appended drawings and figures, wherein like numerals denote like elements, and in which:

FIG. 9 is a data flow diagram that depicts the operation of an example embodiment of a first layer module.

DETAILED DESCRIPTION

Figure 1:
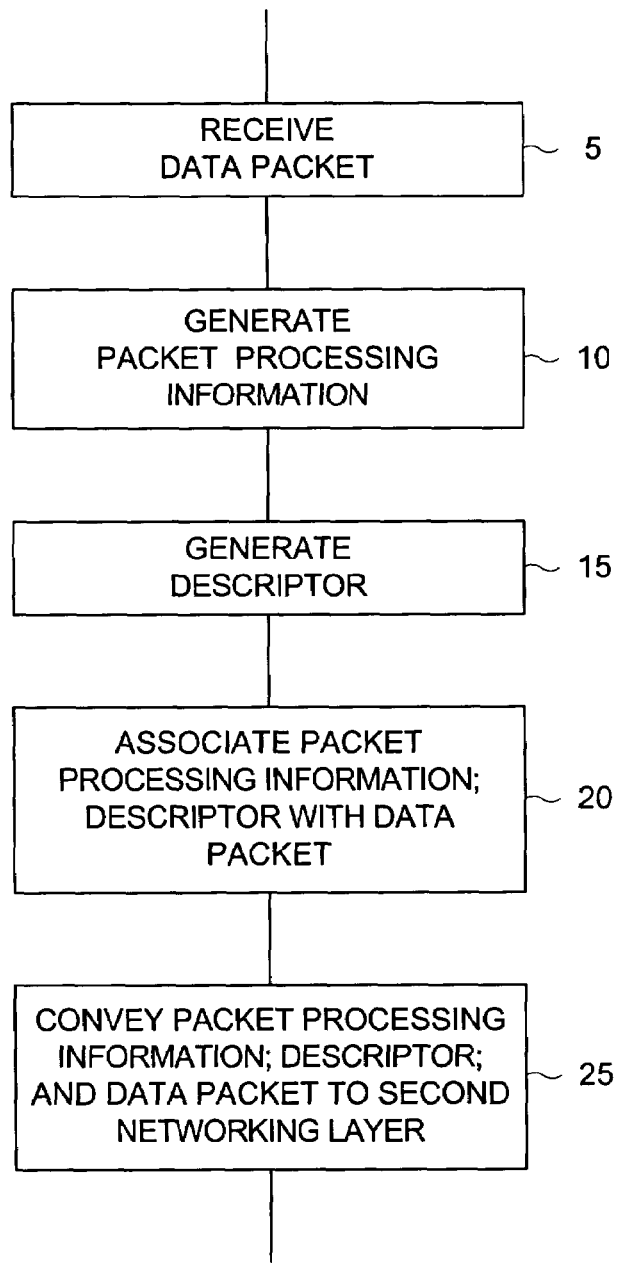
FIG. 1 is a flow diagram that depicts one illustrative method for sending data from one protocol layer to another.

One purpose of computer networking is to enable one process executing on a first computer to communicate with a second process executing on a second computer. Generally, this high level communication between processes is message based. For example, an application executing on one computer may send a message that comprises a request for data stored in a file stored on the second computer. In this example, a second process executing in the second computer may be a network file system service that receives the request message from the first process, reads the requested data from the file and then sends the data back to the first process by way of a reply message.

As already introduced, networking connectivity is a common service provided by an operating system to an executing process (e.g. an application program). The network connectivity provided by an operating system is generally based on a network protocol. Network protocols are generally partitioned into functional layers wherein the collection of functional layers is often referred to as a "protocol stack". When a message is delivered to one of the higher level layers in the protocol stack, it is fragmented into smaller data elements called data packets. Each data packet is processed at each protocol layer as it moves downward through the protocol stack.

Networking apparatus are also partitioned along the functional layers defined by the corresponding network protocol. A networking apparatus is also referred to as a protocol stack and is commonly embodied as a collection of software modules where each software module corresponds to a particular layer in the protocol stack (i.e. the definition thereof). This collection of software modules is also referred to as a protocol stack. Although many embodiments of a protocol stack comprise software, this does not preclude the implementation of one or more layers in the protocol stack as a hardware device. For example, a hardware device can easily be constructed to perform Data Link Layer functions such as framing data and performing error checking. This is true for all other layers in the protocol stack as well.

Because of the one-to-one correspondence between the definition of a network protocol and the embodiment thereof, the networking industry has adopted a rather strange and at times confusing naming convention; the name of a layer in a protocol stack can be used to refer to one or more of the definition of that layer, the functions performed by that layer, a software embodiment of the functions specified by the definition for that layer and a hardware embodiment of the functions specified by the definition for that layer. For example, the terms "Data Link Layer" can be used to refer to the function specified by the networking protocol. This same name can be used to refer to a software or hardware embodiment that implements the function specified for the Data Link Layer.

This confusion can hardly be avoided, and hence, the true meaning of a term used in the art can only be deduced from the context of its use. This disclosure will attempt to avoid some of this confusion. Where the intent is to refer to the process or the method defined by a particular layer of the protocol stack, the terms "layer" or the name of the layer will be used. Where an embodiment is intended, this disclosure will refer to "an embodiment of the layer" or the like. However, in the interest of clarity, it may not be possible to provide such distinction in all instances. This is true not only in this specification itself, but also in the claims appended hereto where an embodiment is referred to as "a layer". Also, it should be noted that the terms "first layer" and "second layer" as used in this disclosure are not intended to refer to any particular layers in a particular protocol stack and are used in the classic connotation of patent preparation; referring to two similar elements (e.g. a first bolt and a second bolt).

It is helpful to understand why a message received from an executing process is fragmented into data packets by considering the functions performed by the lowest levels in the protocol stack. The lowest layer in the protocol stack generally provides very simple communication services. Successively more complex communications services are provided with each higher level layer in the protocol stack. For example, the hardware interface to a computer network (and its software driver) is normally considered to be the bottom-most rung of the protocol stack (Physical Layer). This Physical Layer provides rudimentary connectivity to a networking medium. The physical connection to the medium is structured around small bursts of data transmission (i.e. "packets"). This is one reason why messages received from an executing process are fragmented into data packets.

According to one exemplary definition of a protocol stack, the next higher level protocol layer is known as the Data Link Layer. The Data Link Layer enables connection to a second computer by performing relatively primitive functions including, but not limited to framing a data packet, detecting transmission errors and controlling access to the computer network. One layer above the Data Link Layer, according to this same exemplary definition of a protocol stack, is the Network Layer. The Network Layer manages the destination address for the data packet. This function typically includes logical-to-physical address translation.

At yet a higher layer in the protocol stack, there is a layer called the Transport Layer. The Transport Layer provides transport assurance by communicating with a corresponding layer in a protocol stack executing in a second computer. Through this communication, the two corresponding transport layers exchange acknowledgements of data transfer and request retransmission in the event a data packet is lost or received in a corrupted state. As can be seen, much of the functionality applied to the data communicated across a computer network is accomplished on the basis of some ubiquitous quantum of data (i.e. the data packet).

With the implementation of higher levels of communication services, for example session oriented services and application level services, a data packet becomes laden with overhead information and becomes ensnared in a complex protocol message format. As the protocol message containing the data packet is passed from one protocol layer to the next, the receiving protocol layer needs to extract packet processing information that, in many cases, provides processing directions to the receiving protocol layer. These processing directions typically specify how the data that is part of an original message (i.e. the data packet) is to be processed by the receiving protocol layer.

By the time a data packet is received by a particular layer in the protocol stack, there is significant overhead burden. This is because the data packet is embedded in a complex protocol message. It is a time consuming process to extract from the protocol message the packet processing information associated with a data packet. This is especially true among the lower layers in the protocol stack. This is because additional overhead information is added to the protocol message by each of the upper layers in the protocol stack. To combat this problem, embodiments of various layers in the protocol stack are now designed to communicate some of this packet processing information outside the normal channel (i.e. outside the protocol message containing the data packet). This mechanism of communicating packet processing information from one layer to another is called "out-of-packet" communications.

In a general sense, out-of-packet communication of packet processing information is accomplished when an embodiment of one protocol layer is able to identify packet processing information that pertains to a particular packet. Once this information is identified, it is conveyed to an embodiment of a second protocol layer using the out-of-packet mechanism. The embodiment of the second protocol layer can avoid the processing burden associated with extracting the packet processing information from a protocol message for a given data packet. This saves processing capacity in the computer that is executing the protocol stack in the case where the protocol stack comprises a software embodiment. In the case of a hardware embodiment, the circuitry needed to process a packet may be greatly simplified if it does not need to extract the packet processing information from a protocol message.

FIG. 1 is a flow diagram that depicts one illustrative method for sending data from one protocol layer to another. The present method abandons the notion of using a static template for sending out-of-packet data from one embodiment of a protocol layer to an embodiment of another protocol layer. According to the present method, a data packet is received in an embodiment of a first protocol layer (step 5). Packet processing information for the data packet is generated (step 10). The present method further comprises a step for generating a descriptor for the packet processing information (step 15). The packet processing information, the descriptor and the data packet are all associated with each other (step 20). The packet processing information, the descriptor and the data packet are conveyed to an embodiment of a second protocol layer (step 25). The descriptor supports an extensible mechanism for sending out-of-packet data from the embodiment of one protocol layer to the embodiment of another protocol layer. Even though the present method is extensible, it is still compatible with out-of-packet conveyance mechanisms that use a static template.

Figure 2:
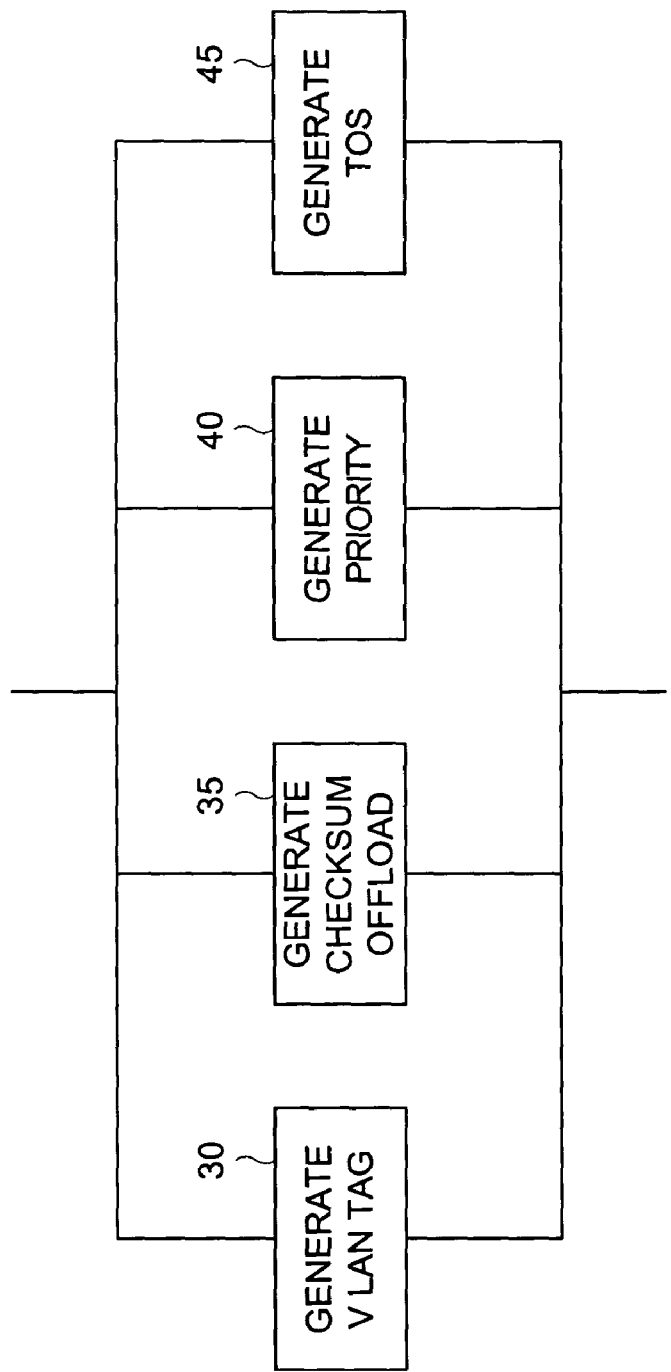
FIG. 2 is a flow diagram that depicts alternative illustrative methods for generating packet processing information.

FIG. 2 is a flow diagram that depicts alternative illustrative methods for generating packet processing information. Generating packet processing information, according to one variation of the present method, comprises generating a virtual local area network tag (step 30). According to yet another variation of the present method, generating packet processing information comprises generating checksum offload information (step 35). According to yet another alternative variation of the present method, generating packet processing information comprises generating a packet priority (step 40). According to yet another illustrative variation of the present method, generating packet processing information comprises generating a type of service indicator for the data packet (step 45).

Generating packet processing information, according to one alternative method, comprises extracting packet processing information from the data packet itself. Generating a virtual local area network tag, a data packet priority indicator and a type of service indicator are some good examples of where extraction is an appropriate method for generating packet processing information from a protocol message. It should be noted that extraction may be applied to a wide variety of information types and the scope of the appended claims is not intended to be limited to the few examples provided here. According to yet another alternative variation of the present method, generating packet processing information comprises extracting information from the data packet and subjecting the extracted information to a post process. For example, checksum offload information, according to one variation of the present method, is generated by extracting data from the data packet and performing a checksum arithmetic operation on the extracted data. It should be noted that various forms and types of packet processing information may be sent from the embodiment of one protocol layer to an embodiment of another protocol layer using the teachings of the present method and the scope of the claims appended hereto is not intended to be limited by any examples heretofore provided.

Figure 3:
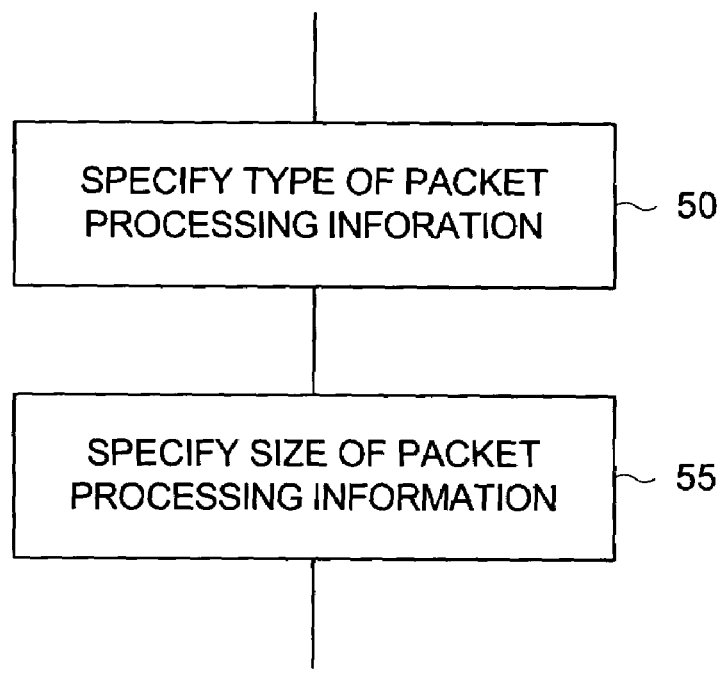
FIG. 3 is a flow diagram that depicts one example method for generating a descriptor for packet processing information.

FIG. 3 is a flow diagram that depicts one example method for generating a descriptor for packet processing information. According to this alternative example method, a descriptor for packet processing information is generated by specifying a packet processing information "type" (step 50). This alternative example method further comprises a step for specifying the size of the packet processing information (step 55). By specifying the type and size of packet processing information, various types and sizes of packet processing information may be sent from the embodiment of one protocol layer to the embodiment of another protocol layer. This results in an extensible means for affecting out-of-packet communications between the embodiments of two protocol layers.

Figure 4:
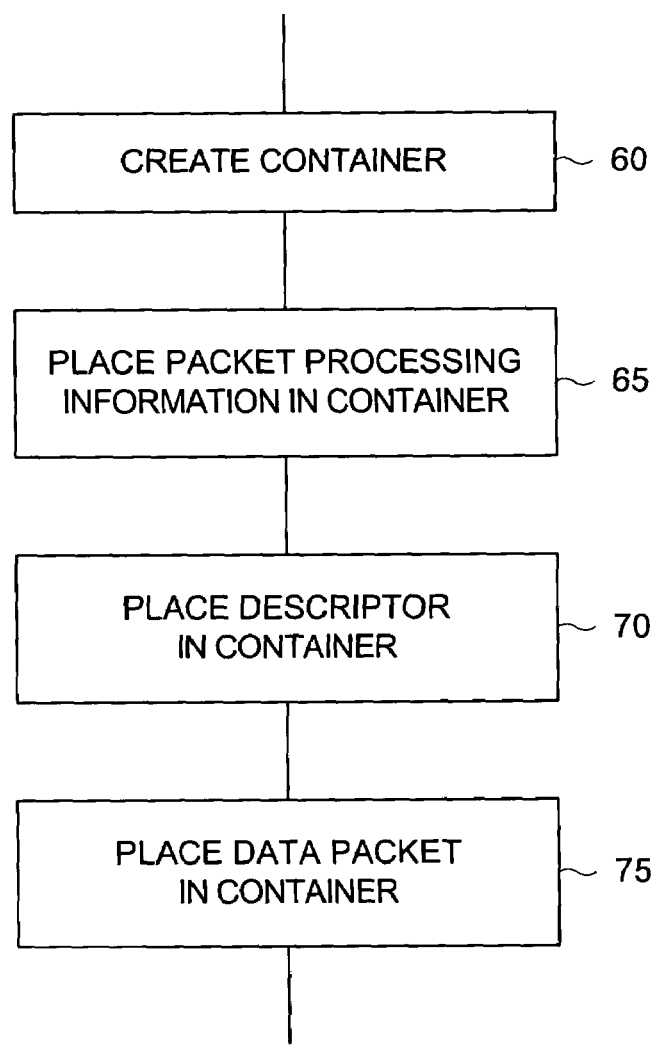
FIGS. 4 and 5 are flow diagrams that depict two alternative example methods for associating packet processing information, a descriptor that describes the packet processing information and a data packet with each other.
Figure 5:
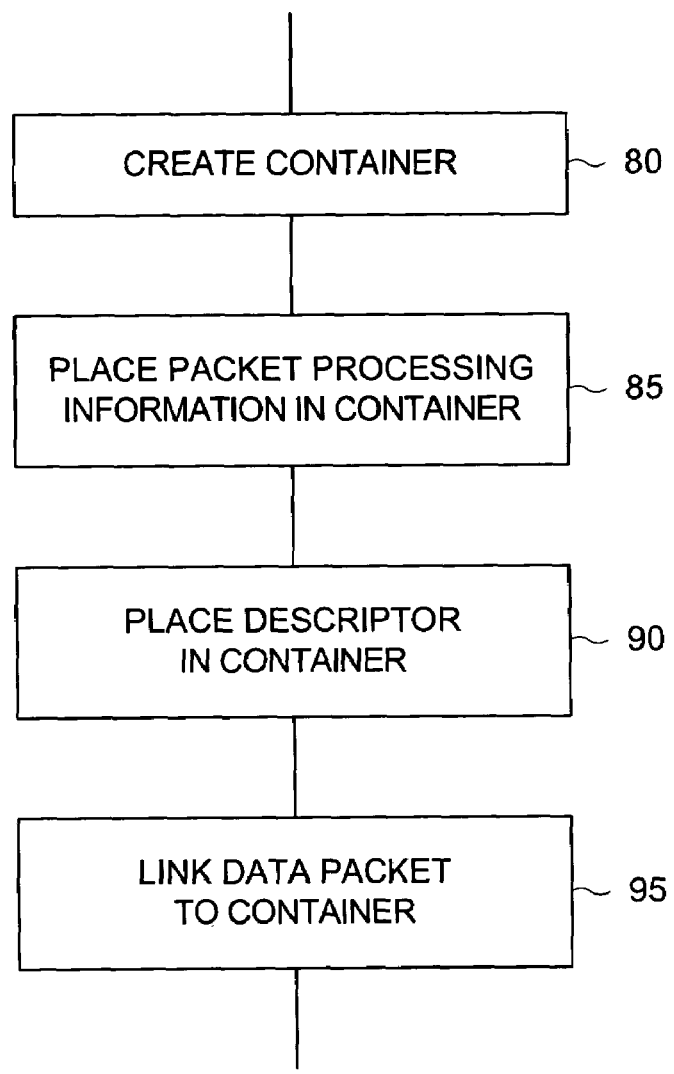

FIGS. 4 and 5 are flow diagrams that depict two alternative example methods for associating packet processing information, a descriptor that describes the packet processing information and a data packet with each other. According to one alternative method, a container is created (step 60). It should be noted that the creation of a container is an optional step. For example, according to one variation of the present method, a container is provided prior to application of the present method. The packet processing information is placed in the container (step 65). The descriptor is also placed in the container (step 70). The data packet is also added to the container (step 75). According to one alternative method, as depicted in FIG. 5, a container is optionally created (step 80) and the packet processing information and its descriptor are placed in the container (steps 85 and 90). Distinguishing this alternative method from the method depicted in FIG. 4, a link to the data packet is placed in the container (step 95) rather than the data packet itself.

Figure 5A:
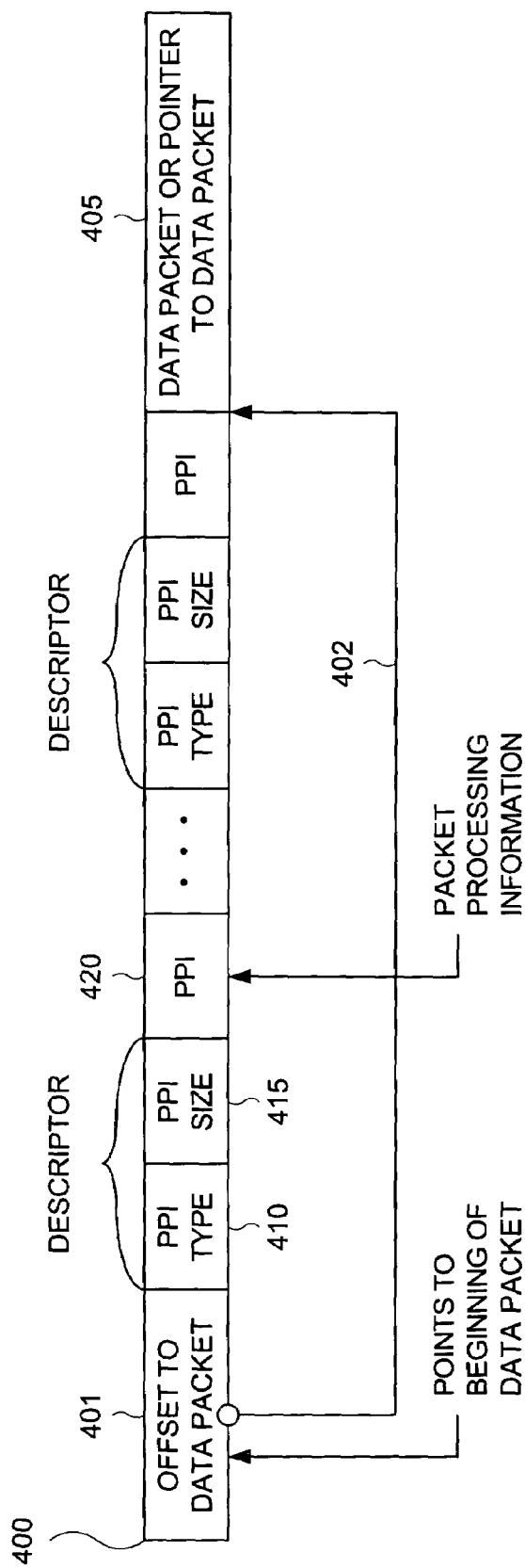
FIG. 5A is a pictorial representation of example embodiment of a container used to contain packet processing information.

FIG. 5A is a pictorial representation of example embodiment of a container used to contain packet processing information. According to this example embodiment, a container 400 comprises an offset compartment 401 that is used to store a pointer 402 (or offset value) to a data packet compartment 405. The data packet compartment 405 is also included in the container 400. According to one example use case, a data packet is stored in the data packet compartment 405. According to yet another example use case, a pointer to a data packet is stored in the data packet compartment 405. A "use case" is an example of how one embodiment of a container 400 can be used by different variations of the present method.

According to this example embodiment, the container 400 further comprises compartments for storing packet processing information. According to one alternative embodiment, the container 400 comprises three compartments for storing a single quantum of packet processing information. These three compartments include a packet processing information (PPI) type compartment 410, a packet processing information size compartment 415 and a packet processing information compartment 420. The packet processing information type compartment 410 is used store an identifier that specifies the type of packet processing information stored in the packet processing information compartment 420. The packet processing information size compartment 415 is used to store either a numeric value or other identifier indicative of the size of the packet processing information stored in the packet processing information compartment 420. The type and size of the packet processing information, according to one example method, are referred to as a descriptor.

In order to provide an extensible mechanism for conveying out-of-packet information between the embodiments of two protocol layers, the container 400, according to one embodiment, comprises a plurality of packet processing information quantum. Hence, a plurality of descriptors, each followed by packet processing information are included in the container 400.

Figure 6:
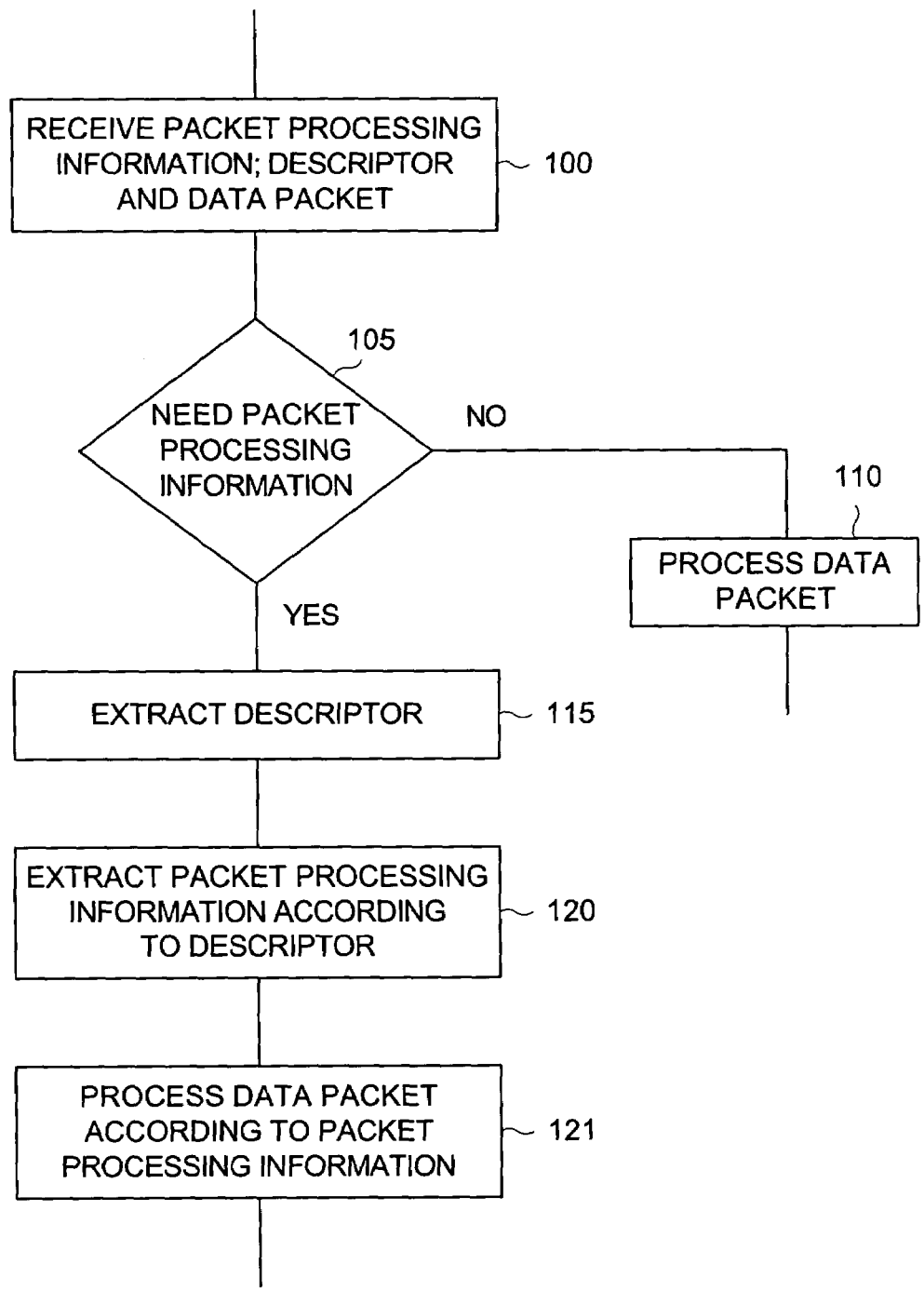
FIG. 6 is a flow diagram that depicts one example method for receiving packet processing information.

FIG. 6 is a flow diagram that depicts one example method for receiving packet processing information. According to one example variation of the present method, the packet processing information, the descriptor and the data packet that are conveyed to the embodiment of the second protocol layer are received (step 100) therein. In the situation where the embodiment of the second protocol layer requires packet processing information (step 105), the descriptor is extracted (step 115). Packet processing information is then recognized according to the descriptor and extracted (step 120). The embodiment of the second protocol layer uses the packet processing information to process the data packet (step 121). When the embodiment of the second protocol layer does not require the packet processing information (step 105), the data packet is processed (step 110) without the packet processing information.

Figure 7:
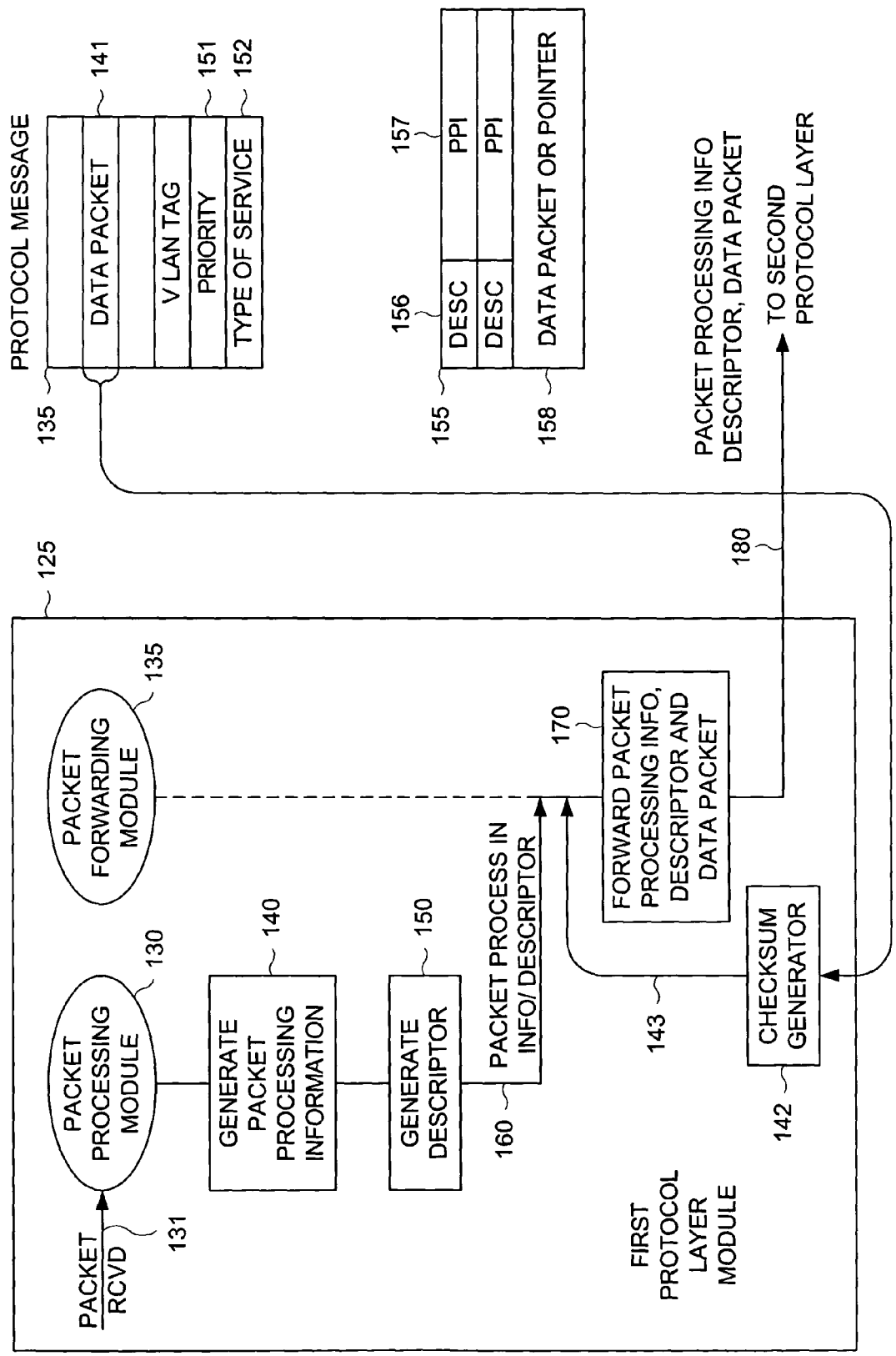
FIG. 7 is a message diagram of one example embodiment of a first protocol layer.

FIG. 7 is a message diagram of one example embodiment of a first protocol layer. According to one embodiment, a protocol stack comprises a first layer module 125. This first layer module 125 comprises an embodiment of a first layer of a networking protocol. According to one example embodiment, the first layer module 125 comprises a packet processing module 130 and a packet forwarding module 135. It should be noted that, although a message diagram is often used to depict the interaction of software elements, the modules, according to one alternative embodiment, comprise hardware elements. The packet processing module 130 is capable of generating packet processing information (step 140) and is further capable generating a descriptor (step 150) according to the teachings of the present method. Accordingly, the packet processing information and the descriptor (connection 160) are directed to the packet forwarding module 135. The packet forwarding module 135 receives the packet processing information and the descriptor and forwards these along with the data packet (step 170) to an embodiment of a second protocol layer (connection 180).

According to one illustrative embodiment, the packet processing module 130 comprises a state machine that receives a signal called "packet received" 131. When the packet received signal 131 becomes active, the packet processing module 130, according to one alternative embodiment, generates at least one of a virtual local area network tag (VLAN Tag), a checksum, a packet priority indicator and a type of service indicator. According to one example embodiment, the packet processing module 130 extracts a virtual local area network tag from a buffer 135 containing a protocol message. This is passed to the packet forwarding module 135 as packet processing information. According to yet another alternative embodiment, the packet processing module 130 retrieves the data packet 141 from the buffer 135 containing the protocol message. The data packet 141 is directed to a checksum generator 142 which is activated by the packet processing module 130. The checksum generator 142 generates a checksum 143 for the data contained in the data packet 141. The checksum 143 is passed to the packet forwarding module 135 as packet processing information. According to yet another example embodiment, the packet processing module 130 extracts a priority indicator 151 from the buffer 135 and provides this to the packet forwarding module 135 as one form of packet processing information. According to yet another alternative illustrative embodiment, the packet processing module 130 extracts a type of service indicator 152 from the buffer 135 used to store a protocol message. The type of service indicator 152 is passed to the packet forwarding module 135 as an alternative form of packet processing information.

According to yet another alternative example embodiment, the packet processing module 130 further comprises a sizing unit that generates a size specifier for the packet processing information conveyed to the packet forwarding module 135. This alternative example embodiment further comprises a typing unit that generates a type specifier for the packet processing information conveyed to the packet forwarding module 135. The size specifier and the type specifier are collectively referred to as a descriptor, which is conveyed to the packet forwarding module 135 (connection 160) along with the packet processing information (connection 160).

According to one alternative embodiment, the packet forwarding module 135 places the packet processing information and the descriptor (i.e. the type and size specifiers) in a container 155 along with the data packet or a pointer to the data packet. The container 155, according to this alternative embodiment, comprises one or more compartments for descriptors (i.e. the type and size specifiers), one or more compartments for packet processing information 157 and a compartment for a data packet 158. The container, according to one alternative embodiment, is passed to the embodiment of the second protocol layer (connection 180).

Figure 7A:
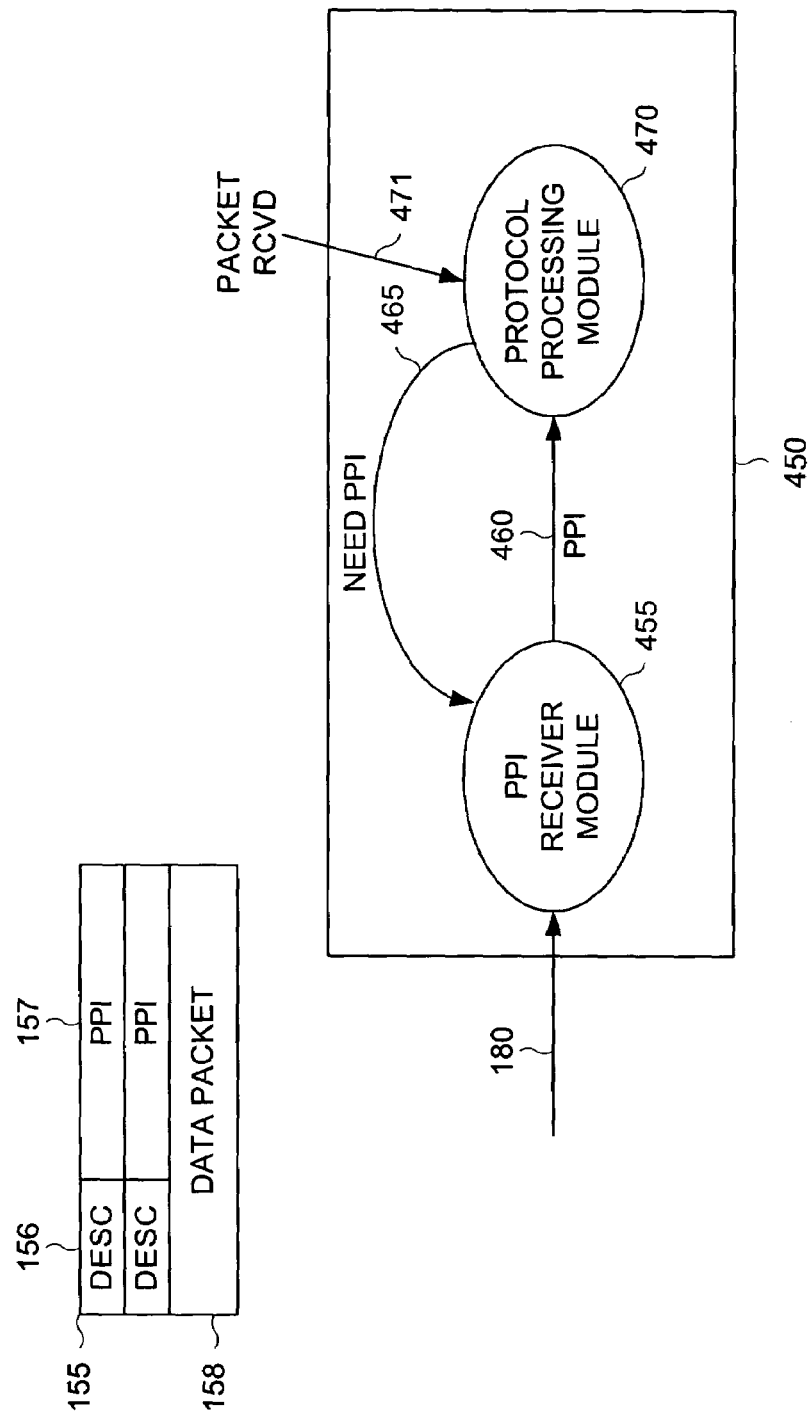
FIG. 7A is a data flow diagram that depicts the operation of an illustrative embodiment of a second protocol layer.

FIG. 7A is a data flow diagram that depicts the operation of an illustrative embodiment of a second protocol layer. According to one example embodiment, the embodiment of a second protocol layer 450 comprises a packet processing information receiver module 455 and a protocol processing module 470. The protocol processing module 470 varies in function according to the functional layer of a networking protocol that is implemented by the example embodiment presented here. For example, a Network Layer function may be implemented if the intent of the second protocol layer is to perform network layer functions. In a different embodiment, the second layer may implement an Application Layer function. These two examples of functional layers are not intended to limit the scope of the appended claims. The appended claims should read on any possible functional layer in a protocol stack.

According to this example embodiment, the protocol processing module 470 receives an indication that it has received a data packet (e.g. a packet received signal 471). Upon receiving indication that a data packet has been received, the protocol processing module 470 indicates to the packet processing information receiver module 455 if packet processing information is needed (signal 465) and, if it is needed, what type of packet processing information is needed. According to this example embodiment, the packet processing information receiver module 455 searches the container 155 it received from an embodiment of a first protocol layer. The subject of this search is to identify packet processing information according to the type of packet processing information needed by the protocol processing module 470. Upon discovering the packet processing information, the packet processing information receiver module 455 extract the packet processing information from the container 155 and directs the packet processing information 460 to the protocol processing module 470. The protocol processing module 470 then processes the data packet using the packet processing information 460. In one alternative embodiment, the protocol processing module 470 retrieves the data packet, either directly or by reference, from the container 155 received from the embodiment of a first protocol layer (connection 180).

Figure 8:
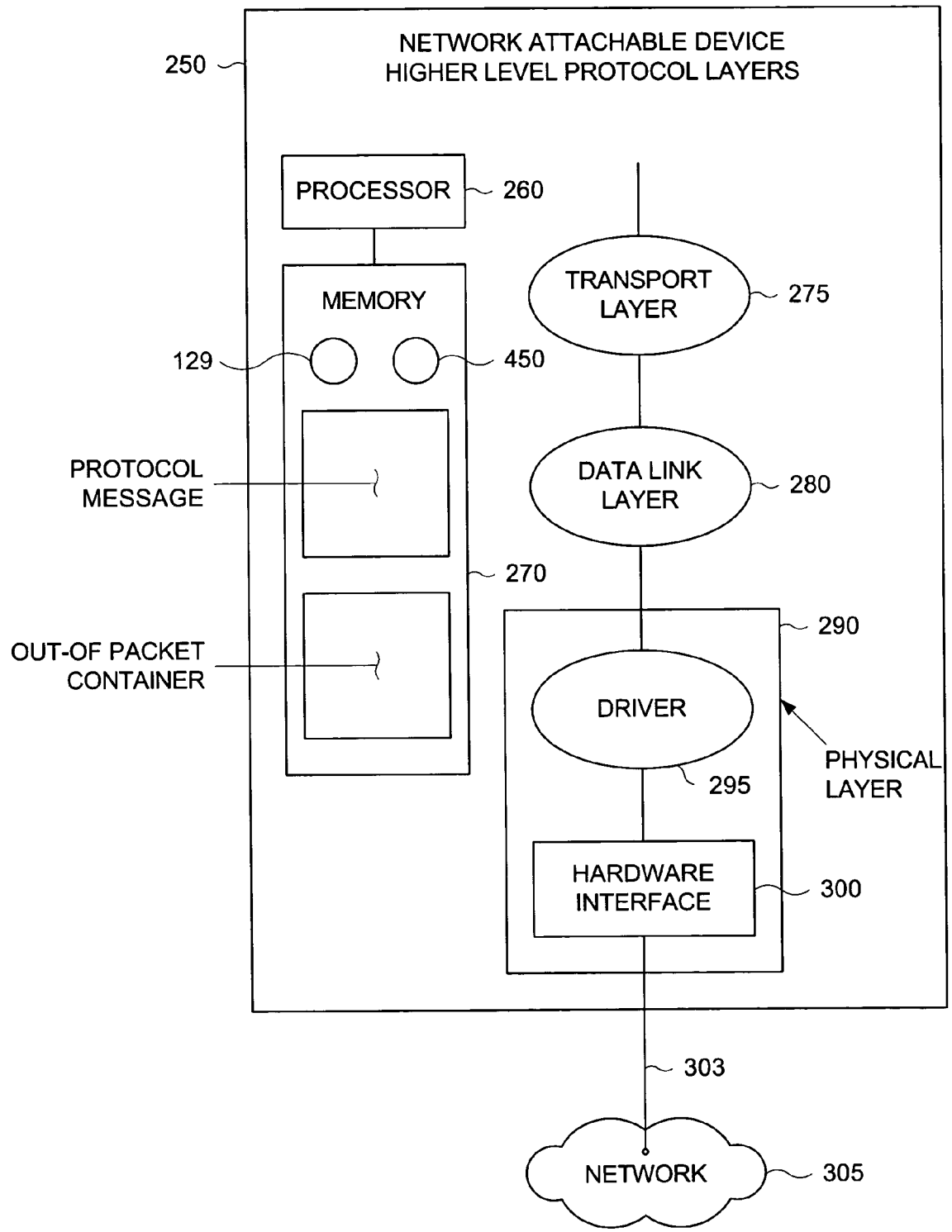
FIG. 8 is a block diagram of a network attachable device.

FIG. 8 is a block diagram of a network attachable device. According to one example embodiment, a network attachable device 250 comprises one or more processors 260 and memory 270. Further comprising the network attachable device is an embodiment of a first protocol layer and is referred to as a first layer module. According to one alternative embodiment, the embodiment of a first layer module comprises a Data Link Layer module 280. It should be noted that the scope of the claims appended hereto is not intended to be limited by any example of an embodiment of a first layer module. The embodiment of a first layer module comprises an instruction sequence stored in the memory 270 from whence it may be executed by the processor 260.

According to one alternative embodiment, the network attachable device further comprises an embodiment of a second protocol layer referred to as a second layer module (shown in FIG. 7A-450). According to one alternative embodiment, the second layer module comprises a Physical Layer module 290. Again, the scope of the appended claims is not intended to be limited to any particular example of an embodiment of a second layer module. Hence, the second layer module 450, according to another alternative embodiment, may comprise a Transport Layer module 275. These examples are intended to illustrate but not limit the scope of the claims appended hereto. Hence, the first layer can be any layer in a protocol stack and the second layer may be any other layer in the protocol stack. The first and second layer need not be contiguous. Hence, according to one example embodiment of the present method, out-of-packet data is communicated from an embodiment of a first protocol layer to an embodiment of a second protocol layer where in fact there are other layers between the first and second layer.

Functional modules in a software based system are herein referred to by a functional name. A functional module comprises an instruction sequence that is executed by one or more processors. As the processor 260 executes the instruction sequence, it performs certain functions commensurate with the teachings of the present method. The reader is advised that the term "minimally causes the processor" and variants thereof is intended to serve as an open-ended enumeration of functions performed by the processor as it executes a particular functional process (i.e. instruction sequence). As such, an embodiment where a particular functional process causes the processor to perform functions in addition to those defined in the appended claims is to be included in the scope of the claims appended hereto. The first and second layer modules described supra comprise such functional modules included as part of a software embodiment of the present method.

FIG. 9 is a data flow diagram that depicts the operation of an example embodiment of a first layer module. As already stated, these modules comprise instruction sequences that can be executed by the processor 260. These instruction sequences will be referred to by a functional module name (e.g. the packet processing module). According to one example embodiment, the first layer module 129 minimally causes the processor 260 (in FIG. 8) to receive a data packet, generate packet processing information for the data packet, generate a descriptor for the packet processing information, associate the packet processing information, the descriptor and the data packet with each other and convey the packet processing information, the descriptor and the data packet to a second layer module. According to one alternative example embodiment, the first layer module 129 comprises a packet processing module 130 and a packet forwarding module 135. According to one alternative embodiment, the packet processing module 130 receives an indication 202 that a data packet 200 has been received by the first layer module 129. According to yet another alternative embodiment, this indication comprises a pointer to a protocol message 201 (ptr_pm).

When executed by the processor 260, the packet processing module 130 minimally causes the processor 260 to generate packet processing information for the data packet 200. According to one alternative embodiment, the packet processing module 130 minimally causes the processor 260 to generate packet processing information by minimally causing the processor 260 to generate at least one of virtual local area network tag information, checksum offload information, packet priority information and type of service information. The packet processing module 130 minimally causes the processor to generate packet processing information according to the present method.

The packet processing module 130 further causes the processor 260 to generate a descriptor for the packet processing information. According to this example embodiment, the packet processing module 130, when executed by the processor 260, minimally causes the processor 260 to generate a type indicator and a size indicator for the packet processing information. The packet processing module 130 manages an individual quantum of packet processing information using a packet processing information data structure 205. The packet processing information data structure 205, according to one example embodiment, comprises storage for a descriptor 210 and storage for the packet processing information 220. The descriptor storage 210 comprises storage for the type and size of the packet processing information stored in the packet processing information data structure 205.

Once the packet processing module 130 has stored the packet processing information it has generated in the packet processing information data structure 205, it passes a pointer to the protocol message 201 and a pointer to the packet processing information data structure 205 to the packet forwarding module 135. The packet forwarding module 135, when executed by the processor 260, minimally causes the processor 260 to place 225 the packet processing information and the descriptor in a container. According to one alternative embodiment, the packet forwarding module 135, when executed by the processor 260, minimally causes the processor to also place the data packet into the container 227. This is accomplished by extracting the data packet 200 from the protocol message 201 pointed to by the pointer to the protocol message received 215 from the packet processing module 130. According to an alternative embodiment, the packet forwarding module 135, when executed by the processor 260, minimally causes the processor to place a pointer into the container 227 in lieu of the data packet. This is accomplished by determining a pointer to the data packet 200 included in the protocol message 201 pointed to by the pointer to the protocol message received 215 from the packet processing module 130.

FIG. 7A also depicts the operation of an alternative embodiment of a second layer module. According to this alternative embodiment, the second layer module 450 comprises an instruction sequence that can be executed by the processor 260 (in FIG. 8). Accordingly, the second layer module 450, when executed by the processor 260, minimally causes the processor to receive the data packet processing information and the descriptor from the first layer module 129. The second layer module 450, by further execution of instructions by the processor 260, minimally causes the processor to recognize the packet processing information according to the descriptor. The second layer module 450 further minimally causes the processor to process the data packet according to the packet processing information.

According to one alternative embodiment, the second layer module 450 comprises a protocol processing module 470 and a packet processing information receiver module 455. Both of these comprise instruction sequences that perform a minimum set of functions when executed by the processor 260. Accordingly, the protocol processing module 470 may implement any layer of networking protocol, for example a Data Link Layer or a Transport Layer. It should be noted that the scope of the appended claims is not intended to be limited to these two examples of a protocol layer. Once the protocol processing module 470 receives an indication that a data packet has been received (e.g. by means of a packet received signal 471), the protocol processing module 470 will dispatch a signal 465 to the packet processing information receiver module 455 when out-of-packet information is needed. In response, the packet processing information receiver module 455, when executed by the processor 260, minimally causes the processor to search a container 155 for packet processing information.

According to one example embodiment, the search is conducted based on the type of packet processing information required by the protocol processing module 470. When the packet processing information is found in the container 155 (for example in a compartment 157 for packet processing information where the associated compartment for a descriptor 157 has stored therein a type indicator that corresponds to the type of packet processing information required by the protocol processing module 470), the packet processing information is extracted by the processor 260 as it continues to execute the packet processing information receiver module 455. As the processor 260 continues to execute the packet processing information receiver module 455, the processor 260 further minimally provides the packet processing information 460 to the protocol processing module 470. Upon receiving the packet processing information 460, the protocol processing module 470 processes the data packet according to the packet processing information 460 it received from the packet processing information receiver module 455.

The functional processes (and their corresponding instruction sequences) described thus far enable network communications wherein out-of-packet communications is accomplished according to the teachings of the present method. According to one embodiment, these functional processes are imparted onto computer readable medium. Examples of such media include, but are not limited to, random access memory, read-only memory (ROM), Compact Disk (CD ROM), floppy disks, and magnetic tape. This computer readable media, which alone or in combination can constitute a stand-alone product, can be used to convert a general-purpose computing platform into a device capable of performing network communications according to the techniques and teachings presented herein. Accordingly, the claims appended hereto are to include such computer readable medium imparted with such instruction sequences that enable execution of the present method and all of the teachings afore described.

The method and various embodiments of apparatus and software thus far described accommodate a plurality of packet processing information quantum for each data packet. In order to ascertain how many packet processing information quantum are included in a container, one alternative embodiment uses a "Last Information" flag in the descriptor to indicate that there are not additional quantum of packet processing information in the container. What this means is that the data packet will immediately follow the packet processing information in the container that is so flagged.

While this disclosure has described several alternative methods and exemplary embodiments, it is contemplated that alternatives, modifications, permutations, and equivalents thereof will become apparent to those skilled in the art upon a reading of the specification and study of the drawings. It is therefore intended that the true spirit and scope of the appended claims include all such alternatives, modifications, permutations, and equivalents.

What is claimed is:

1. A method of improving networking connectivity in a computer; comprising:
   receiving a data packet in a first protocol layer;
   generating packet processing information for the data packet;
   generating a descriptor for the packet processing information, wherein the descriptor describes the packet processing information;
   associating the packet processing information, the descriptor and the data packet with each other; and
   conveying the packet processing information, the descriptor and data packet to a second protocol layer, wherein the second protocol layer uses the packet processing information to process the data packet.

2. The method of claim 1 wherein generating packet processing information comprises:
   generating at least one of virtual local area network tag information, checksum offload information, packet priority information and type of service information.

3. The method of claim 1 wherein generating a descriptor comprises:
   specifying the type of packet processing information generated; and specifying the size of packet processing information generated.

4. The method of claim 1 wherein associating the packet processing information, the descriptor and the data packet with each other comprises:
   placing the packet processing information in a container;
   placing the descriptor in the container; and
   placing the data packet in the container.

5. The method of claim 1 wherein associating the packet processing information, the descriptor and the data packet with each other comprises:
   placing the packet processing information in a container;
   placing the descriptor in the container; and
   linking the data packet to the container.

6. The method of claim 1 further comprising:
   receiving the conveyed packet processing information, descriptor and data packet in the second protocol layer;
   recognizing the packet processing information according to the descriptor; and
   utilizing the packet processing information to process the data packet within the second protocol layer.

7. A protocol stack comprising:
   first layer module capable of receiving a data packet comprising:

packet processing module capable of generating packet processing information and a descriptor for the packet processing information, wherein the descriptor describes the packet processing information; and packet forwarding module capable of forwarding the packet processing information, the descriptor and the data packet to a second layer module, wherein the second layer module uses the packet processing information to process the data packet.

8. The protocol stack of claim 7 wherein the packet processing module is capable of generating at least one of virtual local area network tag information, checksum offload information, packet priority information and type of service information.

9. The protocol stack of claim 7 wherein the packet processing module generates a descriptor by specifying the type of the packet processing information and by specifying the size of the packet processing information.

10. The protocol stack of claim 7 wherein the packet forwarding module places the packet processing information and the descriptor in a container and places the data packet in the container.

11. The protocol stack of claim 7 wherein the packet forwarding module places the packet processing information and the descriptor in a container and links the container with the data packet.

12. The protocol stack of claim 7 further comprising a second layer module capable of receiving the packet processing information, the descriptor and the data packet and is further capable of recognizing the packet processing information according to the descriptor and processing the data packet in accordance with the packet processing information.

13. A network attachable device comprising:
processor for executing instructions;
memory for storing instruction sequences; and
first layer module instruction sequence that, when executed by the processor, minimally causes the processor to:
receive a data packet;
generate packet processing information for the data packet;
generate a descriptor for the packet processing information, wherein the descriptor describes the packet processing information;
associate the packet processing information, the descriptor and the data packet with each other; and
convey the packet processing information, the descriptor and the data packet to a second layer module, wherein the second layer uses the packet processing information to process the data packet.

14. The network attachable device of claim 13 wherein the first layer module instruction sequence includes a packet processing instruction sequence that, when executed by the processor, minimally causes the processor to generate packet processing information by generating at least one of virtual local area network tag information, checksum offload information, packet priority information and type of service information.

15. The network attachable device of claim 13 wherein the first layer module instruction sequence includes a packet processing instruction sequence that, when executed by the processor, minimally causes the processor to generate a descriptor by generating a type indicator for the packet processing information and by generating a size indicator for the packet processing information.

16. The network attachable device of claim 13 wherein the first layer module instruction sequence includes a packet forwarding instruction sequence that, when executed by the processor, minimally causes the processor to:
place the packet processing information in a container;
place the descriptor in the container; and
place the data packet in the container.

17. The network attachable device of claim 13 wherein the first layer module instruction sequence includes a packet forwarding instruction sequence that, when executed by the processor, minimally causes the processor to:
place the packet processing information in a container;
place the descriptor in the container; and
link the data packet to the container.

18. The network attachable device of claim 13 further comprising a second layer module instruction sequence, that when executed by the processor, minimally causes the processor to:
receive the packet processing information using the descriptor to recognize the packet processing information;
receive the data packet; and
process the data packet according to the packet processing information.

* * * * *

UNITED STATES PATENT AND TRADEMARK OFFICE
CERTIFICATE OF CORRECTION

| | | |
|---|---|---|
| PATENT NO. | : 7,457,881 B2 | Page 1 of 1 |
| APPLICATION NO. | : 10/641941 | |
| DATED | : November 25, 2008 | |
| INVENTOR(S) | : Ansari Mohamed et al. | |

It is certified that error appears in the above-identified patent and that said Letters Patent is hereby corrected as shown below:

In column 12, line 23, in Claim 1, delete "computer;" and insert -- computer --, therefor.

Signed and Sealed this

Seventh Day of April, 2009

JOHN DOLL
*Acting Director of the United States Patent and Trademark Office*